United States Patent [19]

Zeorlin

[11] Patent Number: 4,627,590
[45] Date of Patent: Dec. 9, 1986

[54] STOWAGE RECEIVER FOR FIXED LENGTH ROD

[75] Inventor: Daniel H. Zeorlin, Wichita, Kans.

[73] Assignee: The Boeing Company, Seattle, Wash.

[21] Appl. No.: 677,568

[22] Filed: Dec. 3, 1984

[51] Int. Cl.[4] .......................................... F16M 13/00
[52] U.S. Cl. .................................................... 248/351
[58] Field of Search ........ 248/200, 351, 352, 339–341, 248/251; 292/339, 262, 341.17, 229, 219, 240, 209; 180/69.21

[56] References Cited

U.S. PATENT DOCUMENTS

| 1,621,630 | 3/1927 | Debus | 292/228 |
| 2,091,651 | 8/1937 | Platt | 292/228 |
| 2,178,998 | 11/1939 | Scott . | |
| 2,741,505 | 4/1956 | Courney | 292/341.7 |
| 2,929,650 | 3/1960 | Squire | 292/219 |
| 3,117,689 | 1/1964 | Dedic | 292/262 |
| 3,225,856 | 12/1965 | Caramanna | 292/262 |

FOREIGN PATENT DOCUMENTS

| 2853399 | 6/1980 | Fed. Rep. of Germany | 292/262 |
| 270915 | 9/1927 | Italy | 292/240 |
| 2123472 | 2/1984 | United Kingdom | 292/251.5 |

Primary Examiner—Reinaldo P. Machado
Assistant Examiner—Alvin Chin-Shue
Attorney, Agent, or Firm—Kokjer, Kircher, Bradley, Wharton, Bowman & Johnson

[57] ABSTRACT

A mounting bracket for stowing an aircraft cowling support rod in its standby position. The bracket has a swingable arm pivoted to fixed support. The arm carries a transverse, spool-shaped shaft configured to mate with the notched end of the support rod so that the free end of the rod can be easily and securely attached to the shaft. A spring biases the arm of the bracket toward swinging in the direction of the permanent attachment of the support rod to the aircraft, thereby automatically compensating for any variations in the length of the rod to insure that vibrations of the rod do not occur during operation of the aircraft engine.

7 Claims, 6 Drawing Figures

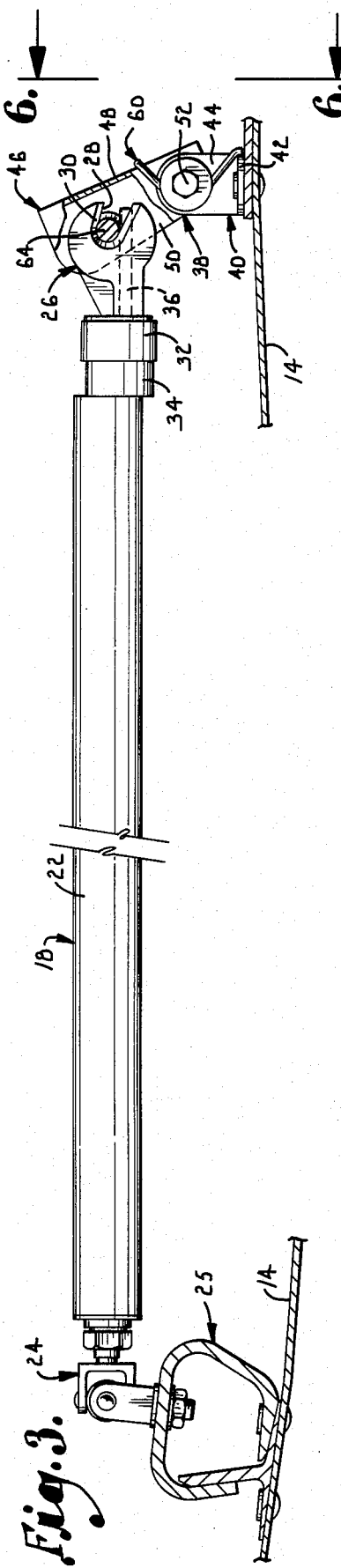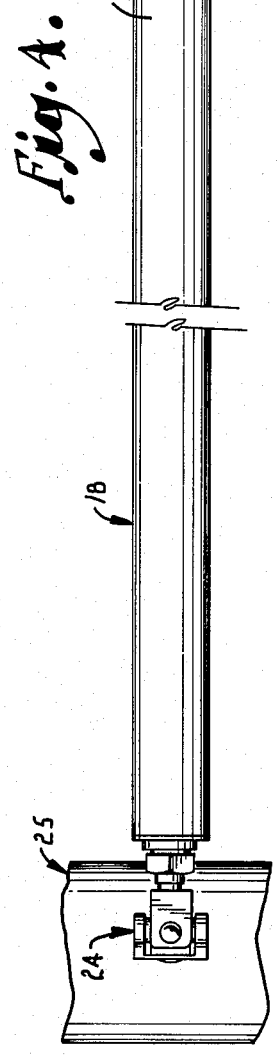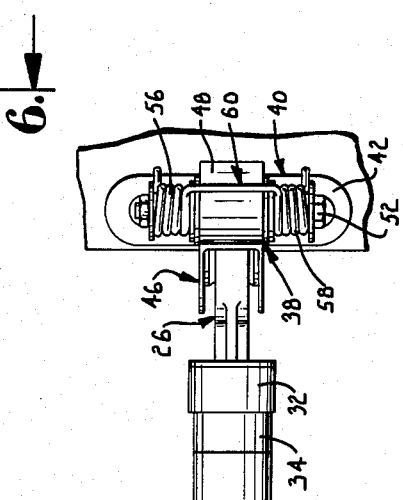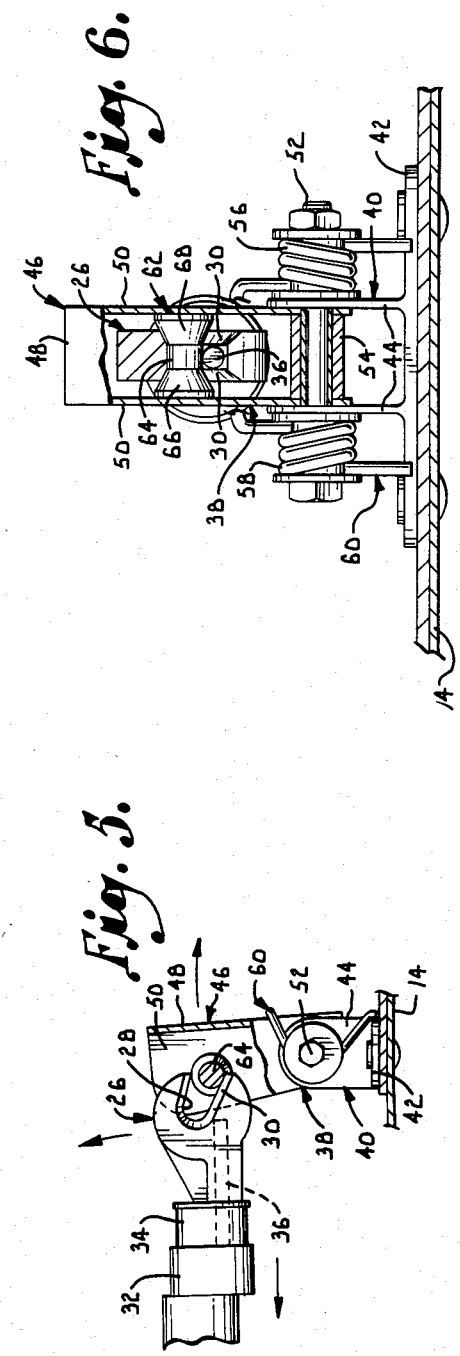

STOWAGE RECEIVER FOR FIXED LENGTH ROD

This invention relates to mounting brackets, and more particularly to receiver for securing the free end of a fixed length rod when the latter is not in active use.

Aircraft are commonly provided with elongated, rigid support members which serve to hold the engine cowling open when access into the engine compartment is required. The members or support rods are mounted at one end to the interior of a cowl section usually by a universal joint, to permit ready movement of the member into the cowl supporting position. When in use, the "free" end of the rod is often connected to a fixed structure such as to some part of the engine frame so that the support holds the cowl open preventing against inadvertent closure and consequent damage or personal injury.

When not in use, the support rod is swung to a stowed position lying generally alongside the interior surface of the cowling. It is highly important that the rod be securely fastened against accidental dislodgement when in this stowed position. It is also equally important that any tendency for the rod to vibrate when the engine is in operation be eliminated.

Attempts have been made to use a telescoping rod to accommodate both of these considerations. It had been thought that such a rod, fixedly mounted to the compartment wall at one end, and telescoping with an internal spring bias to engage a fixed mounting bracket at the other end, would effectively dampen the tendency for the stowed rod to vibrate and would provide adequate security against dislodgement from the stowed position.

Such telescoping rod construction has not proven to be satisfactory. The excessive temperatures experienced in aircraft engine compartments of this type adversely affect reliable operation of the telescoping features of such rods. As a result, aircraft manufacturers have been forced to revert to the use of fixed length, non-telescoping rods for this purpose.

These solid rods, because of their fixed, non-adjustable lengths, cannot incorporate vibration damping mechanisms as a part of their integral construction. Neither can such rods include built-in rod length adjustment features to insure secure stowage in the engine compartment in conjunction with fixed mounting brackets.

It has heretofore been proposed to utilize a fixed clevis and retractable pin arrangement to secure the free ends of rods of this type, the pins of such devices extending transversely to the longitudinal rod axis. Mounting devices of this type not only are generally incapable of providing the desirable anti-vibration and rod length compensation features heretofore described, they also require two-handed operations to install and remove the support rods into and out of their stowed positions. This is cumbersome and results in the loss of valuable time and effort which could otherwise be conserved.

Accordingly, it is a primary object of the present invention to provide a novel receiver in the nature of a stowage bracket for rods of this type, which bracket inherently compensates for any variations in rod length resulting from temperature variations, wear or other causes.

It is a further object of this invention to provide such a bracket having the capability of effectively furnishing the vibration dampening function required to eliminate objectionable and damaging rod vibration while the rod is stowed in its standby position in the engine compartment during operation of an aircraft.

In the achievement of the foregoing objects, it is yet another object of this invention to provide a bracket which is entirely reliable for safely and securely holding the rod in its standby, stowed position.

Still another object of the present invention is to provide a rod capable of achieving the aforestated objectives, yet which is constructed in a manner which lends itself to quick and easy operator manipulation for installation and removal of the rod to and from its bracket mounted position.

These and other important aims and objectives of the present invention will be further explained or will become apparent from the following explanation and description of the drawings, wherein:

FIG. 3 is a fragmentary, detailed cross-sectional view taken along line 3—3 of FIG. 1, a typical cowl support rod and the mounting bracket of this invention appearing in elevation, parts being broken away and shown in cross-section to reveal details of construction;

FIG. 4 is a top plan view of the rod and bracket of FIG. 3;

FIG. 5 is a fragmentary, side elevational view of the rod and bracket of FIGS. 3 and 4 illustrating the movement of the respective components for releasing the rod from the bracket; and FIG. 6 is an enlarged, detailed, fragmentary, crosssectional view taken along line 6—6 of FIG. 3, parts being broken away and shown in cross-section to reveal details of construction.

Figure 1:
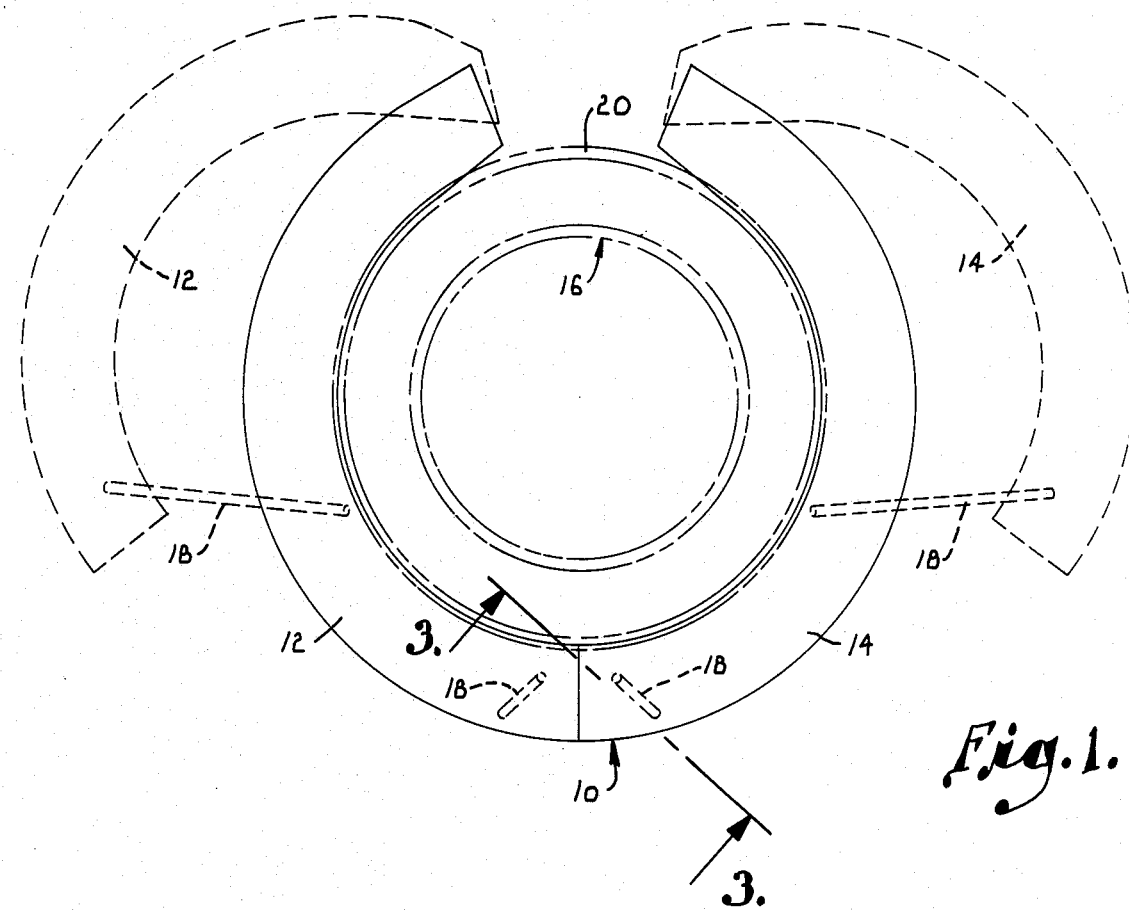
FIG. 1 is a partially schematic, front elevational view on a reduced scale of a typical aircraft engine and cowling arrangement, the stowed and operational positions of the cowl support rods and the open positions of the engine cowls being shown in phantom.
Figure 2:
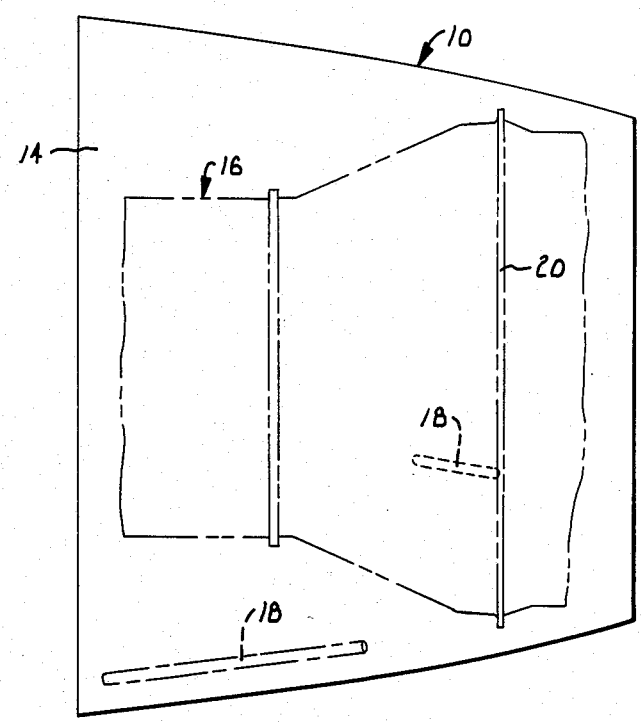
FIG. 2 is a side elevational view of the cowling of FIG. 1, the engine appearing fragmentally in phantom as are the operational and standby positions of the cowl support rod.

FIGS. 1 and 2 of the drawing illustrate a typical cowling 10 comprised of a pair of cowl sections 12 and 14 which are hinged to an aircraft for movement between the full line positions and the dash line positions shown in FIG. 1. When the sections are in the full line positions, they are in covering relationship over an engine 16. Movement of each section to its dash line position provides access to the engine compartment as may be required for engine service and maintenance operations and the like. Suitable hinge structure is, of course, provided for connecting the cowl sections to the aircraft. Inasmuch as such structure forms no part of the instant invention, it need not be illustrated or described in detail.

Each of the individual cowl sections is held in its opened position by means of its respective elongated, rigid support rod 18 which is manually interposed between the engine and the cowl section. One end of each rod 18 is typically mounted for swinging movement to the interior surface of its corresponding cowl section and the free end of the rod is adapted to be releaseably connected to a peripherally extending engine flange 20, thereby holding the corresponding section in its opened position. When not in use, the rods 18 are carried in the stowed or standby positions lying generally parallel with the inside surfaces of the respective cowl sections in the manner illustrated in dash dot lines in FIGS. 1 and 2 of the drawing. Inasmuch as the cowl support rods and stowage brackets for each cowl section are identical, only one set will be described in detail.

The bracket comprising the subject matter of this invention is shown in conjunction with the support rod which it serves to secure in stowed position in FIGS. 3 through 6 of the drawing. The rod 18 comprises an elongated, rigid support member 22 having a universal joint 24 affixed to one end thereof. U-joint 24 is, in turn, fixedly secured by a mounting element 25 to the internal surface of the aircraft cowl section 14 as illustrated in FIG. 3. The end of rod 18 remote from U-joint 24 has a generally circular shaped head 26 having a notch 28 communicating with the extreme outermost end of the rod head and extending generally toward the center of the arcuate portion of the head as shown in the drawings. Each side of head 26 has a rim 30 extending peripherally around the notch and tapered inwardly from the generally flat, parallel side faces of the head.

A collar 32 is telescoped over an offset portion 34 of member 22 proximal the free end of the rod. Collar 32 slides freely over the outer surface of portion 34 and is connected with an elongated, rigid locking plunger 36. Plunger 36 is received within a suitable bore (not shown) in head 26 communicating with notch 28. Rod 18, including head 26 and its locking sleeve and plunger arrangement, is entirely conventional and forms no part of the present invention. It suffices to say that the rod is provided with an internal spring (not shown) associated with plunger 36 normally biasing the collar and plunger to the extreme outermost position thereof shown in FIG. 3 of the drawing. This position of plunger 36 permits the free end of rod 18 to be locked onto a shaft received within notch 28, such as would conventionally be installed on the engine flange 20 to hold the rod in the cowl supporting position. The rod head 26 can be quickly and easily released from its locked position over a shaft of this type by manually sliding collar 32 against the bias of the internal spring to withdraw plunger 36 into the position thereof illustrated in FIG. 5 of the drawing. So long as the plunger is in its extended position, however, the extreme outermost end of the plunger closes the outermost end of notch 28 a sufficient amount to insure against inadvertent release of the rod head 26 from the shaft.

A mounting element incorporating a fixed shaft on engine flange 20 is entirely suitable for securing the free end of rod 18 in position to support the cowl section in its open position. Slight variations in the fixed rod length, as might occur from wear, temperature variations, or the like creates no substantial disadvantage because of the available relative movement between the swinging cowl section which carries the rod and the engine flange upon which the bracket is mounted in fixed location. Any such rod length variation would only minutely effect a variation in the extent to which the cowl section is held open by the rod. Such variations are too slight to be noticed and can have no adverse effect whatsoever on access to the engine compartment.

Even slight variations in rod length can, however, have a substantial effect on the satisfactory mounting of the free end of the rod in its stowed or standby position. The fixed end of the rod and the bracket which might secure the free end of the rod are both mounted on the same rigid member, namely the cowl section to which the rod is attached. Any variations in rod length which are not accommodated by the free end mounting bracket can be expected to result in intolerable rod vibrations during operation of the aircraft. Such vibration of the rod would also lead to unnecessary wear on the affected structure.

The bracket of this invention, particularly constructed to eliminate intolerable vibration associated with the storage of a fixed length cowl support rod, is broadly designated in the drawings by the reference numeral 38. Bracket 38 comprises a support 40 including an elongated, rigid, substantially flat base plate 42 which is adapted to be fixedly secured to the interior surface of its corresponding cowl section, such as section 14, by rivets or the like. Support 40 includes a pair of spaced apart, parallel ears 44 integral with base plate 42 and projecting upwardly therefrom. Bracket 38 also includes an elongated, rigid arm 46 preferably formed from an initially flat sheet of material bent upon itself into generally transversely U-shaped configuration having a medial web 48 and a pair of spaced apart parallel flanges 50 extending parallel with the ears 44 of support 40. The ears 44 are provided with apertures which are aligned with corresponding holes in the arm flanges 50 to receive an elongated axle in the form of a bolt 52 pivotally coupling the arm 46 to support 40 for swinging movement of the arm toward and away from the point of pivotal attachment of rod 18 to its fixed support 26. The point of pivotal attachment of the rod to its support is, of course, defined by the intersection of the axes of pivoting movement of U-joint 24.

A tubular spacer 54 is telescoped over bolt 52 between the spaced apart arm flanges 50. Bolt 52 projects outwardly beyond the respective ears 44 a sufficient distance to receive the coil sections 56 and 58 of a double torsion spring 60 in telescoped relationship over the projecting ends of the bolt as shown in the drawings. One end of each spring section is integrally attached to the corresponding end of the other section so that these spring ends engage web 48 of arm 46. The other ends of the respective spring sections are engaged against base plate 42 as illustrated best in FIG. 6 of the drawing. Thus spring 60 exerts a substantial, yet uniform biasing force tending to swing arm 46 about bolt 52 in a counterclockwise direction as illustrated in FIG. 3. Suitable bearings may be interposed between the bolt and the spring sections and retaining washers may also be installed as illustrated in the drawings.

Means for securing the free end of a corresponding support rod 18 to bracket 38 comprises a shaft 62 having opposed ends secured to the corresponding proximal flanges 50 of arm 46 and spanning the distance therebetween. Shaft 62 is preferably of transversely circular configuration and has a central portion 64 and a pair of enlarged, spaced apart end sections 66 and 68. The end sections 66 and 68 respectively are tapered inwardly as illustrated in FIG. 6 so that the transverse diameter of the shaft increases as the respective outermost ends of the shaft are approached. This taper provides a generally spool like configuration and the tapers of the sections 66 and 68 are configured to complementally engage the correspondingly tapered rims 30 on either side of the support rod head 26, as will be hereinafter more fully explained.

In operation, the cowl support rod 18, when disengaged from its cowl supporting position attached to the engine flange, is moved to the stowed position by swinging the free end of the rod into proximity with bracket 38. The operator manually swings the bracket arm 46 in a clockwise direction as viewed in FIG. 3.

Simultaneously, collar 32 of the rod is moved to the left withdrawing plunger 36 within the rod, thereby completely opening notch 28. The spool like shaft 62 is engaged into the notch while the operator releases arm 46 and also releases sleeve 32 to permit plunger 36 to project into the notch, locking the rod to the bracket. Actually, the operator can simultaneously grasp sleeve 32 while extending one or more fingers into engagement with arm 46 to effect the interconnection of the rod with the attaching bracket with one hand. Conversely, when the rod is to be released from its stowed condition, the collar 32 is shifted in the direction of the arrow in FIG. 5. Simultaneous upward swinging movement of the rod results in detachment of the rod from the bracket as the arm 46 of the latter is cammed out of the notch as will be readily understood.

The construction of bracket 38 wherein arm 46 is constantly biased toward the point of pivotal attachment of rod 18 to the cowl section prevents any looseness in the rod and bracket attachment which would lead to intolerable vibrations during operation of the aircraft. The spool shape of shaft 62 which complementally engages the tapered rims of the rod head 26 insures that the head is firmly seated intermediate the adjacent arm flanges 50 and spaced from the latter to prevent rattling of the components. Any wear which may occur to rod head 26 is automatically compensated for by the bias of spring 60. This insures the snug fitting together of the components at all times.

I claim:

1. A bracket for releasably securing in standby position the free end of an elongated, rigid rod used to prop a swingable cover of an airplane engine cowl, said rod being mounted at one end to the cowl for swinging movement about a pivot point, said bracket comprising:
 a support adapted to be mounted to the airplane in fixed position adjacent the free end of the rod when the latter is in said standby position;
 an arm pivotally coupled to the support for swinging movement toward and away from said rod free end when the rod is in said standby position;
 means carried by the arm and adapted to engage the rod free end for releasably securing the arm to the rod; and
 spring means operably coupled with the support and with the arm for yieldably biasing the arm toward the rod, the arm being in disposition relative to the rod for exerting a compressive force longitudinally of the rod under the influence of said spring means when the rod is engaged with the bracket at said standby position, whereby the rod and arm may be manually swung to respective positions of mutual engagement of the rod free end and said securing means for releasably securing the rod in the standby position with said compressive force exerted on the rod dampening any tendency of the rod to rattle during operation of the engine.

2. The invention of claim 1, wherein said rod free end is provided with a notch, and wherein said securing means includes a shaft carried by the arm and swingable with the latter along a path of travel adapted to move the shaft into and out of the notch.

3. The invention of claim 2, wherein the arm includes a pair of spaced apart flanges, and wherein the shaft spans the distance between said flanges, whereby the free end of the rod may be received between the flanges with the shaft received in said notch.

4. The invention of claim 2, the sides of said rod adjacent the notch being tapered inwardly as the notch is approached, and wherein the shaft is spool shaped having a tapered peripheral groove, the taper of said shaft groove corresponding to the taper of said rod sides to permit complemental engagement between the shaft and the rod end when the rod is in said position.

5. The invention of claim 1, wherein said support includes a base plate adapted to be secured in said fixed position, and a pair of spaced apart, parallel ears integral with the plate and projecting outwardly therefrom, each ear having an aperture, and wherein said arm includes a web and pair of flanges integral with the web and extending in parallelism with said ears, each flange being provided with an opening, the openings and the apertures being mutually aligned, and wherein is included an elongated axle received through the openings and apertures for pivotally coupling the arm to the support.

6. The invention of claim 5, wherein said spring means includes a torsion spring received over said axle and having one end engaged with the arm and the other end engaged with the support for biasing the arm toward the rod pivot point.

7. The invention of claim 5, wherein said spring means includes a pair of spaced apart torsion spring sections, one end of each section being integrally attached to the corresponding end of the other section, said axle projecting outwardly at each side of the bracket beyond the respective ears and flanges, a torsion section being received over each end of the axle with the interconnected ends of the sections engaged against the arm between the sections, the other ends of the spring sections engaging the support at corresponding sides thereof, whereby to insure uniform biasing force for the bracket arm.

* * * * *